US006943843B2

(12) United States Patent
Boyden et al.

(10) Patent No.: US 6,943,843 B2
(45) Date of Patent: Sep. 13, 2005

(54) CAMERA POSITIONING SYSTEM AND METHOD FOR EYE-TO EYE COMMUNICATION

(75) Inventors: James H. Boyden, Seattle, WA (US); Kory D. Christensen, Kaysville, UT (US); David W. Meibos, Sandy, UT (US); Thomas M. Hardman, Salt Lake City, UT (US)

(73) Assignee: Digeo, Inc., Kirkland, WA (US)

( * ) Notice: Subject to any disclaimer, the term of this patent is extended or adjusted under 35 U.S.C. 154(b) by 705 days.

(21) Appl. No.: 09/966,334

(22) Filed: Sep. 27, 2001

(65) Prior Publication Data

US 2003/0058363 A1 Mar. 27, 2003

(51) Int. Cl.[7] .......................... H04N 7/14; H04N 5/225
(52) U.S. Cl. ..................... 348/373; 348/14.16
(58) Field of Search .......................... 348/14.01, 14.16, 348/211.2, 373, 374, 375, 376; 345/158, 175, 207

(56) References Cited

U.S. PATENT DOCUMENTS

| | | | |
|---|---|---|---|
| 3,520,587 A | 7/1970 | Tasaki et al. ................. 350/36 |
| 4,284,898 A | 8/1981 | Felkel et al. ................. 250/551 |
| 4,607,622 A | 8/1986 | Fritch et al. .................... 128/6 |
| 4,714,184 A | 12/1987 | Young et al. ................. 224/253 |
| 4,863,130 A | 9/1989 | Marks, Jr. ................. 248/206.3 |
| 5,318,257 A | 6/1994 | Tani ............................. 248/125 |
| 5,359,362 A | 10/1994 | Lewis et al. ................... 348/15 |
| 5,438,357 A | 8/1995 | McNelley .................... 348/15 |
| 5,456,245 A | 10/1995 | Bornhop et al. ............. 600/139 |
| 5,500,671 A | 3/1996 | Andersson et al. ........... 348/15 |
| 5,519,597 A | 5/1996 | Tsai ............................. 362/386 |
| 5,572,248 A | 11/1996 | Allen et al. ................... 348/15 |
| 5,612,733 A | 3/1997 | Flohr ........................... 348/14 |
| 5,675,376 A | 10/1997 | Andersson et al. ........... 348/20 |
| 5,678,793 A | 10/1997 | Hill ......................... 248/206.3 |
| 5,713,548 A | 2/1998 | Boyer et al. ............. 248/205.2 |
| 5,815,197 A | 9/1998 | Kakii ........................... 348/20 |
| 5,855,343 A | 1/1999 | Krekelberg ................. 248/121 |
| 5,917,542 A | 6/1999 | Moghadam et al. ........ 348/207 |
| 5,986,703 A | 11/1999 | O'Mahony ................... 348/333 |
| 6,005,604 A | 12/1999 | Kakii ........................... 348/20 |
| 6,010,235 A | 1/2000 | Sawyer ....................... 362/351 |
| 6,081,422 A | 6/2000 | Ganthier et al. ............ 361/686 |
| 6,172,703 B1 | 1/2001 | Lee .............................. 348/15 |
| 6,259,470 B1 | 7/2001 | Koizumi et al. ........... 348/14.1 |
| 6,462,781 B1 | 10/2002 | Arnold ....................... 348/373 |
| 6,606,081 B1 * | 8/2003 | Jaeger et al. ............... 345/111 |
| 6,654,050 B2 * | 11/2003 | Karube et al. ........... 348/220.1 |

FOREIGN PATENT DOCUMENTS

| | | | |
|---|---|---|---|
| JP | 07-131697 | 5/1995 | |
| JP | 9-307807 | 5/1996 | ..................... 5/232 |

OTHER PUBLICATIONS

Wireless Video Surveillance: System Concepts by Petri Mähönen; pp. 1–6.
The Embedded Bluetooth CCD Camera by Ko Sung–Yuan; 2001; pp. 1–4.

* cited by examiner

*Primary Examiner*—Wendy R. Garber
*Assistant Examiner*—Timothy J Henn
(74) *Attorney, Agent, or Firm*—Kory D. Christensen; Stoel Rives LLP (57) ABSTRACT

Eye-to-eye videoconferencing may be carried out through the use of a camera secured to an attachment mechanism. The attachment mechanism removably secures the camera to a screen portion of a display screen such that the camera is disposed between the display screen and a person engaged in videoconferencing. In one embodiment, the attachment mechanism is a suction cup. In one alternate embodiment, the attachment mechanism takes the form of first and second strips of double-sided tape. In another alternate embodiment, the attachment mechanism includes first and second magnets removably secured to front and back sides of a flat panel display. Magnetic force between the first and second magnets removably secures the camera to a screen portion of the flat panel display.

18 Claims, 6 Drawing Sheets

CAMERA POSITIONING SYSTEM AND METHOD FOR EYE-TO EYE COMMUNICATION

BACKGROUND

1. Field of the Invention

The present invention relates generally to the field of video communication. More specifically, the present invention relates to a system and method for positioning a camera to enable eye-to-eye videoconferencing.

2. Description of Related Background Art

Videoconferencing is rapidly becoming a popular method of communication between remote parties who wish to approximate face-to-face contact without travel. As bandwidth limitations are ameliorated, more events such as business meetings, family discussions, and shopping may be expected to take place through videoconferencing.

Unfortunately, videoconferencing has been limited in the past by the relative positions of the camera, the display screen, and the person. More specifically, the camera is typically positioned above, beside, or below the screen. As a result, a person looking into the screen appears to be looking above, below, or to the side of the person with whom they are speaking. Eye contact is never actually made because neither party looks at the camera; rather, each person looks at his or her own screen. Consequently, both parties perceive that true face-to-face communication is not occurring.

Some devices have been made in an attempt to more closely simulate eye-to-eye communication. Such devices may involve, for example, the use of complex and specialized display screens with advanced optical and projection equipment. Unfortunately, most consumers would wish to communicate via conventional, inexpensive personal computer or entertainment hardware such as "webcams" and televisions.

Accordingly, what is needed is a system and method for obtaining an image of a person from along the person's eye level when the person is looking at the image of a second person on a screen. Preferably, such a system should lend the impression of eye-to-eye communication without unduly burdening other aspects of the videoconferencing process. Additionally, such a system and method should preferably be adaptable to existing consumer hardware.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

The present invention solves the foregoing problems and disadvantages by providing an apparatus for obtaining a video signal from a position proximate an eye level of a person viewing a display screen, and a related method of positioning the camera. The apparatus and method may be configured in a wide variety of ways to suit specific videoconferencing situations.

In one implementation, the apparatus may include a camera having a lens contained within a housing. The camera may take the form of a wireless camera in which electromagnetic waves carry audio and video signals to an audio/video receiver unit. Alternatively, some form of wire may facilitate communication between the camera and the audio/video receiver unit.

The wireless camera is secured to an attachment mechanism. In one embodiment, the attachment mechanism is a suction fitting, such as a suction cup. The suction cup includes a concave face, a convex face, and an engagement member that is inserted into and releasably or permanently retained within an orifice in the housing to secure the suction cup to the housing. When pressed against a screen portion of a display screen, the suction cup will push out the air between the concave face and the screen portion, creating a vacuum. This vacuum removably secures the suction cup, and therefore the camera, to the screen portion such that the camera is disposed between the display screen and the person using the apparatus.

Videoconferencing may occur between a person using the apparatus and another person whose image is displayed on the screen portion of the display screen. During videoconferencing, the person using the apparatus may position the suction cup and wireless camera proximate the eyes of the image on the screen portion. This provides the realistic semblance of eye-to-eye communication for the person whose image is displayed on the screen portion, i.e., the person with whom the person using the apparatus is communicating.

Of course, the actual location of the camera will vary depending on the location of the image on the screen portion. For some people, moving the camera to an eye level position will require the wireless camera to be positioned at the center of the screen portion. For other viewers, however, the wireless camera may need to be positioned in other areas of the screen portion.

The apparatus may include a camera holder secured to the display screen. The camera holder may include an open-ended pocket having a scalloped portion that permits access to the wireless camera for insertion and removal and/or operation of the camera from within the camera holder. The camera holder may be secured to the display screen in an orientation such that the wireless camera may be inserted into the camera holder and rest at the bottom of the open-ended pocket.

When the display screen is used for purposes, other than videoconferencing, the wireless camera and suction cup may be removed from the screen portion and inserted into the open-ended pocket. Advantageously, when the wireless camera and the suction cup are removed from the screen portion, the screen portion may be substantially free of residue from the suction cup.

If desired, the wireless camera may have an adjustable pan and/or tilt setting, so that during videoconferencing the person need not have his or her head directly aligned with the display screen in the lateral or transverse directions. The person may also use such a pan and/or tilt setting to utilize the wireless camera for videoconferencing when the wireless camera is located in the camera holder.

The wireless camera may include first and second antennas, a receiver, a driver circuit, an image sensor, a correlated double sampling (CDS) unit, a gain control unit, a transmitter, and a power source. Of course, the wireless camera may also include various other or different components as will be known to those skilled in the art. The wireless camera may be in communication with an audio/video receiver unit that is configured to transmit signals recorded by the wireless camera over a communications network, and to receive a series of video signals for display on the screen portion.

In one alternate embodiment, the attachment mechanism includes an adhesive layer, and in particular, takes the form of first and second strips of double-sided tape secured to the housing. Each strip of double-sided tape includes a backing layer with a first adhesive layer on one side and a second adhesive layer on the opposite side. The first adhesive layer secures the double-sided tape to the housing. The second adhesive layer removably secures the double-sided tape to the screen portion such that the camera is disposed between the display screen and the person. The adhesive layers may be of any type that can be firmly adhered to a nonporous surface, such as a glass or plastic screen, and removed without damaging the surface.

In another alternate embodiment, the display screen takes the form of a flat panel display. The attachment mechanism includes first and second magnets. The housing of the wireless camera is secured to one side of the first magnet. If the first and second magnets are substantially aligned on opposite sides of the screen portion, the magnetic force between the first and second magnets removably secures the first magnet to the screen portion such that the wireless camera is disposed between the flat panel display and the person. Protective pads may be secured to the first and second magnets to protect the display screen from scratches, gouges, or the like.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of attachment mechanisms, camera positions, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The following discussion makes particular reference to two-way video communication. However, those skilled in the art recognize that video communication typically involves two-way audio communication, Thus, where video communication and corresponding components are specifically illustrated, audio communication and corresponding components may be implied.

Figure 1:
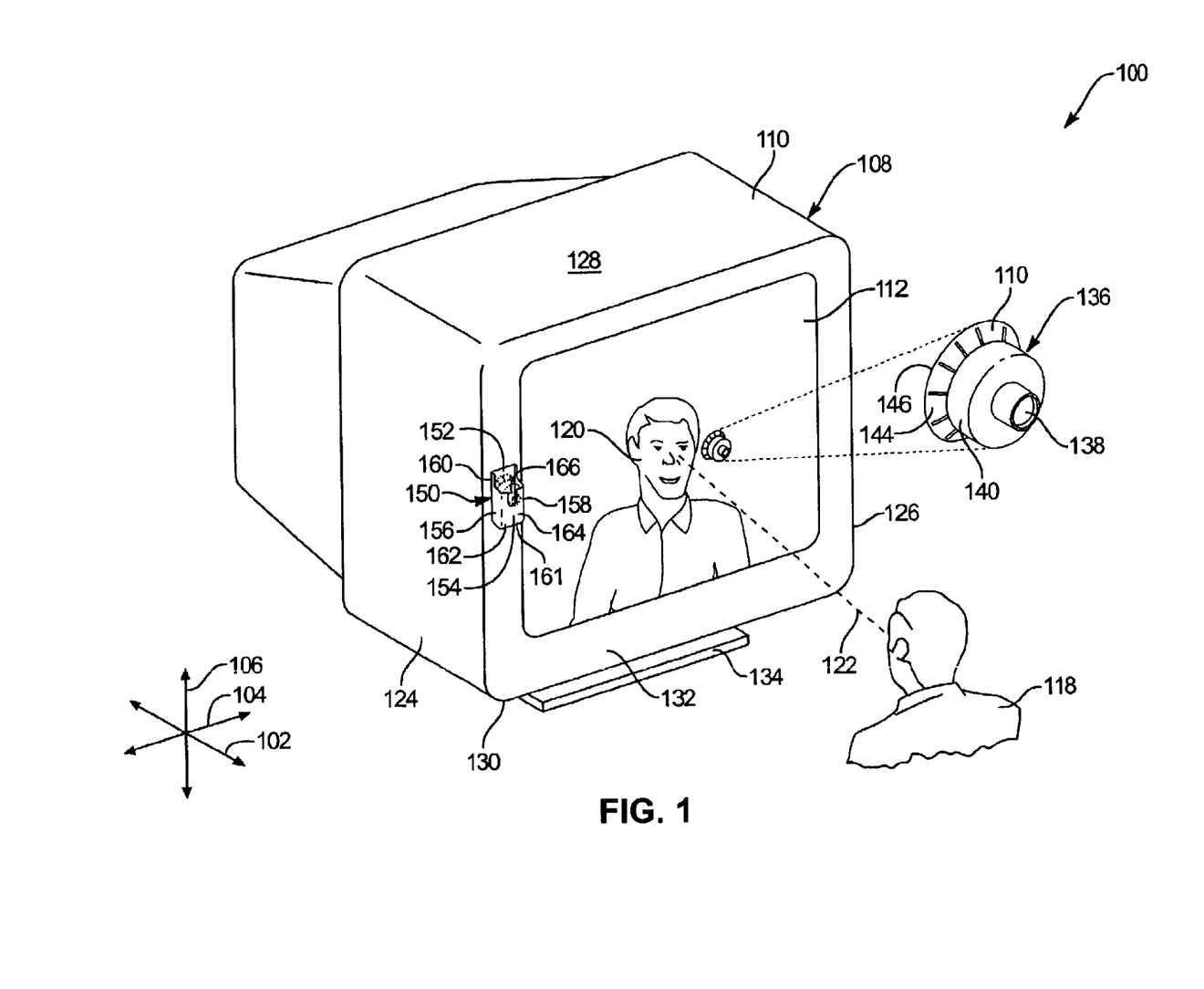
FIG. 1 is a perspective view of one embodiment of an apparatus for obtaining a video signal from a position proximate an eye level of a person viewing a display screen.

Referring to FIG. 1, a perspective view shows one embodiment of an apparatus 100 for obtaining a video signal from a position proximate an eye level of a person viewing a display screen. The apparatus 100 may have a longitudinal direction 102, a lateral direction 104, and a transverse direction 106. A display screen 108 may be of any known type such as a cathode ray tube (CRT) screen, a liquid crystal display (LCD), liquid plasma display, analog or digital projection, or the like. Advantageously, the display screen 108 may be a device commonly available to consumers, such as a computer monitor or television. The display screen 108 may have a housing 110 that contains the internal components of the display screen, and a screen portion 112 on which images are displayed.

The display screen 108 may be used by a person 118 to conduct videoconferencing with a second person, whose image 120 is shown on the screen portion 112 of the display screen 108. The person 118 may be expected to look at the image 120, so that the person 118 is looking along an eye level 122, as shown by a dashed line in FIG. 1. The person 118 may, for example, look approximately at the eyes of the person whose image 120 is shown on the screen portion 112.

The display screen 108 may have a left side 124, a right side 126, a top side 128, a bottom side 130, and a front side 132. Furthermore, the display screen 108 may have a base 134 that supports the weight of the display screen 108. The base 134 may be rigid, or may permit swiveling or tilting of the display screen 108. Of course, the display screen 108 may also operate without a base 134.

The apparatus 100 has a camera 136 having a lens 138 contained within a housing 140. The lens 138 may, for example, be retained within an aperture of the housing 140 so that light is able to enter the housing 140 through the lens 138. In FIG. 1, the camera 136 takes the form of a wireless camera 136. The wireless camera 136 transmits audio and video signals of the person 118 to an audio/video receiver unit (not shown). The operation of the wireless camera 136 will be described in greater detail in connection with FIG. 2.

"Wireless," as used herein, should not be construed to mean that the wireless camera 136 does not have any wires connected to it. Rather, the term "wireless" should be construed in accordance with its typical meaning within the field of electronics, i.e., as referring to a method of information transfer in which electromagnetic waves carry the signal over part or all of the communication path. Moreover, the present invention is not limited to use with a wireless camera 136. Some form of wire, such as shielded or unshielded twisted pair, coaxial cable, or optical fiber, may facilitate communication between the camera 136 and the audio/video receiver unit.

The wireless camera 136 is secured to an attachment mechanism 142, which may take the form of a suction fitting 142. A "suction fitting" is any device that holds two objects together by creating a region of low pressure fluid between the objects. Thus, flexible enclosures such as suction cups, as well as rigid, evacuated volumes are all suction fittings.

In FIG. 1, the suction fitting 142 is a suction cup 142 having a convex face 144, a concave face 146, and an engagement member (not shown) on the convex face 144. The suction cup 142 may be made of an elastomer such as latex or some other suitable material. When pressed against the screen portion 112, the suction cup 142 will push out the air between the concave face 146 and the screen portion 112, creating a vacuum. This vacuum causes the suction cup 142 to be removably secured to the screen portion 112.

As used herein, the word "secure" by itself has a broader meaning than the phrase "removably secure." In particular, to "removably secure" two objects means to attach them in such a way that they may thereafter be separated by hand in a nondestructive manner. For example, after the suction cup 142 has been "removably secured" to the screen portion 112, the suction cup 142 may thereafter be removed from the screen portion 112 by pulling the suction cup 142 away from the screen portion 112. In contrast, to simply "secure" two objects means to attach them in any fashion, either removably or permanently.

Although a suction cup 142 is shown in FIG. 1, a suction fitting 142 in accordance with the present invention may be any device that removably secures the camera to the screen portion 112 through the use of suction. For example, the suction fitting 142 may take the form of a container that is capable of forming an enclosed area when pressed against the screen portion 112. A suction pump may be secured to the container to pump the air out of the enclosed area, thereby creating a vacuum within the enclosed area and causing the container to be removably secured to the screen portion 112.

During videoconferencing, the person 118 may position the suction cup 142, and therefore the wireless camera 136, proximate the eyes of the image 120 on the screen portion 112, as shown in FIG. 1. This provides the realistic semblance of eye-to-eye communication for the person whose image 120 is displayed on the screen portion 112, i.e., the person with whom the person 118 using the apparatus 100 is communicating.

In FIG. 1, the wireless camera 136 is not disposed precisely along the eye level 122. If the wireless camera 136 is simply positioned proximate, or close to, the eye level 122 as shown in FIG. 1, the person whose image 120 is shown on the screen portion 112 may not notice that the person 118 is looking slightly to one side, or up or down. Thus, if both parties involved in videoconferencing are using an apparatus 100, slight displacement of the wireless cameras 136 from eye level 122 may provide realistic eye-to-eye communication for both parties simultaneously. However, in accordance with the present invention, the wireless camera 136 may be positioned precisely along eye level 122 so that a portion of the image 120 may be blocked by the wireless camera 136.

Of course, the actual location of the wireless camera 136 will vary depending on the position of the image 120 on the screen portion 112. In some situations, moving the wireless camera 136 to a position proximate the eye level 122 will require the wireless camera 136 to be positioned at the center of the screen portion 112. In other situations, however, the wireless camera 136 may need to be positioned in other areas of the screen portion 112.

In FIG. 1, the apparatus 100 includes a camera holder 150 secured to the front side 132 of the display screen 108, to the side of the screen portion 112 and approximately halfway between the top side 128 and bottom side 130 of the display screen 108. The camera holder 150 includes an open-ended pocket 152, which consists of a front portion 154, first and second side portions 156 and 158, a back portion 160, and a bottom portion 161. The front portion 154 is joined to the side portions 156 and 158 by first and second curved portions 162 and 164. The front portion 154 includes a scalloped portion 166 that permits access to the wireless camera 136 for insertion into and removal from the open-ended pocket 152.

The camera holder 150 is secured to the display screen 103 by a fastening mechanism (not shown) in an orientation such that the wireless camera 136 may be inserted into the camera holder 150 and rest on the bottom portion 161 of open-ended pocket 152. The fastening mechanism may take the form of an adhesive, a hook and loop fastener (e.g., Velcro®), or the like. The camera holder 150 may be positioned at any desired location on the display screen 108, including on the left side 124, the right side 126, the top side 128, or the bottom side 130.

When the display screen 108 is used for purposes other than videoconferencing, such as computer or television use, the wireless camera 136 and suction cup 142 may be removed from the screen portion 112 and inserted into the open-ended pocket 152. Advantageously, when the wireless camera 136 and suction cup 142 are removed from the screen portion 112, the screen portion is substantially free of residue from the suction cup 142. This allows the person to use the display screen 108 for other purposes without having to first clean the screen portion 112.

If desired, the wireless camera 136 may have adjustable pan and/or tilt setting, so that during videoconferencing the person 118 need not have his or her head directly aligned with the display screen 108 in the lateral direction 104 or the transverse direction 106. The person 118 may also use such pan and/or tilt settings to utilize the wireless camera 136 for videoconferencing when the wireless camera 136 is located in the camera holder 150. For example, the wireless camera 136 may be located in the open-ended pocket 152 so that the lens 138 is visible through the scalloped portion 166. The person 118 may then tilt the wireless camera 136 to the right to account for the fact that the wireless camera 136 is disposed to the left of the screen portion 112.

Additionally, the camera 136 may have features that automatically deactivate the camera 136 when the camera 136 is removed from the screen portion 114 to protect the privacy of the person 118. For example, the camera 136 may have a mechanical switch, proximity sensor, light sensor, or the like (not shown) disposed on the housing 110 adjacent to the screen portion 114. When the camera 136 is removed from the screen portion 114, the switch or sensor may stop the camera 136 from transmitting video data. Such switches or sensors may disable or enable operation of the camera 136 when the camera 136 is stowed within the camera holder 150, as desired.

If desired, the camera 136 may include one or more light emitting diodes (LED's) that provide a visual indication of whether the camera 136 is operating. Alternatively, the camera 136 may be equipped with a mechanical shutter that can be manually closed or actuated through the use of a switch or sensor to assure the person 118 that the camera 136 is not receiving any image.

Furthermore, if desired, the camera 136 may have an optical sensor (not shown) disposed on the housing 110 adjacent to the screen portion 114 to enable the person 118 to control the camera 136. For example, through the use of specialized software, hardware, or firmware, commands to control functions such as panning, tilting, zooming, contrast adjustment, and brightness adjustment could be translated into patterns of flashes, color changes, or the like. The patterns may be displayed on the portion of the screen portion 114 behind the camera 136. The patterns may be read by the sensor of the camera 136, and the camera 136 may then adjust its operation to carry out the user command.

Figure 2:
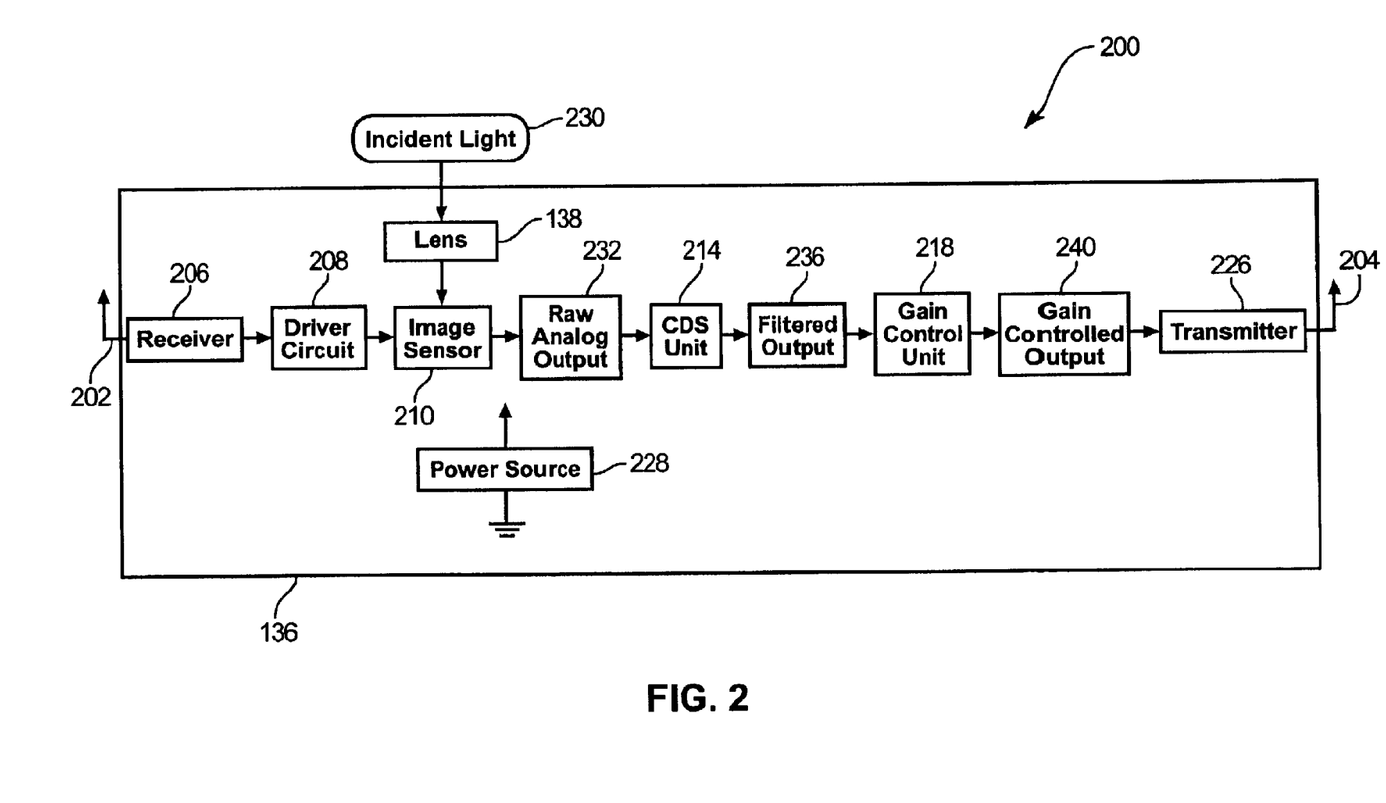
FIG. 2 is a block diagram of the functional components of the wireless camera of FIG. 1.

Referring now to FIG. 2, there is shown a block diagram 200 of the functional components of the wireless camera 136. The wireless camera 136 consists of first and second antennas 202 and 204, a receiver 206, a driver circuit 208, an image sensor 210, a correlated double sampling (CDS) unit 214, a gain control unit 218, a transmitter 226, and a power source 228. The wireless camera 136 may be in communication with an audio/video receiver unit (not shown). The audio/video receiver unit may be configured to facilitate videoconferencing; i.e., to transmit audio/video signals recorded by the wireless camera 136 over a communications network, and to receive a series of signals for display on the screen portion 112. The audio/video receiver unit may, for example, be a set top box for a cable or satellite network, or the like.

When the wireless camera 136 is in operation, a timing circuit in the audio/video receiver unit generates timing and control signals that are received by the first antenna 202 and demodulated by the receiver 206. The driver circuit 208 utilizes the demodulated timing signals to drive the image sensor 210. Incident light 230 reflected from the person 118 passes through the lens 138 and converges onto the image sensor 210, which then converts the light intensity and color pattern of the image into analog electrical signals.

Raw analog output 232 from the image sensor 210 is fed into the CDS unit 214, which takes a first sample and a second sample of the raw analog output 232. The CDS unit 214 then generates a filtered output 236 corresponding to the difference between the first and second samples. The purpose of this step is to remove low frequency noise and any offsets common to both samples.

The filtered output 236 of the CDS unit 214 is then fed into the gain control unit 218, which controls the gain of the filtered output 236 in order to prevent later stages from being overloaded. Gain-controlled output 240 of the gain control unit 218 is fed into the transmitter 226 for modulation. The modulated audio and video signals are then transmitted to the audio/video receiver unit by the second antenna 204.

Those skilled in the art will recognize that the above functional components may be implemented in a variety of ways. For example, the image sensor 210 may take the form of a charge-coupled device (CCD), CMOS sensor, or the like. The transmitter 226, receiver 206, and antennas 202 and 204 may operate according to a variety of protocols, including the IEEE 802.11 RF wireless standards (i.e., 802.11, 802.11a, and 802.11b), Bluetooth, HiperLan, and HiperLan/2. The CDS 214 may take the form of two parallel sample-and-hold circuits. The gain control unit 218 may be either an automatic or manual gain control circuit, both of which are well known in the art. And the power source 228 may take the form of a battery pack, examples of which are well-known in the art.

Moreover, FIG. 2 illustrates only one possible configuration of a wireless camera 136. Those skilled in the art will recognize that various other configurations and components may be provided within the scope of the invention. For example, the XCam2™ wireless camera manufactured by X10 Wireless Technologies, Inc.® of Seattle, Wash. has a different configuration than that described above, but may still be used in accordance with the present invention. In addition, various standard components are not illustrated in the above description in order to avoid obscuring aspects of the invention.

Figure 3:
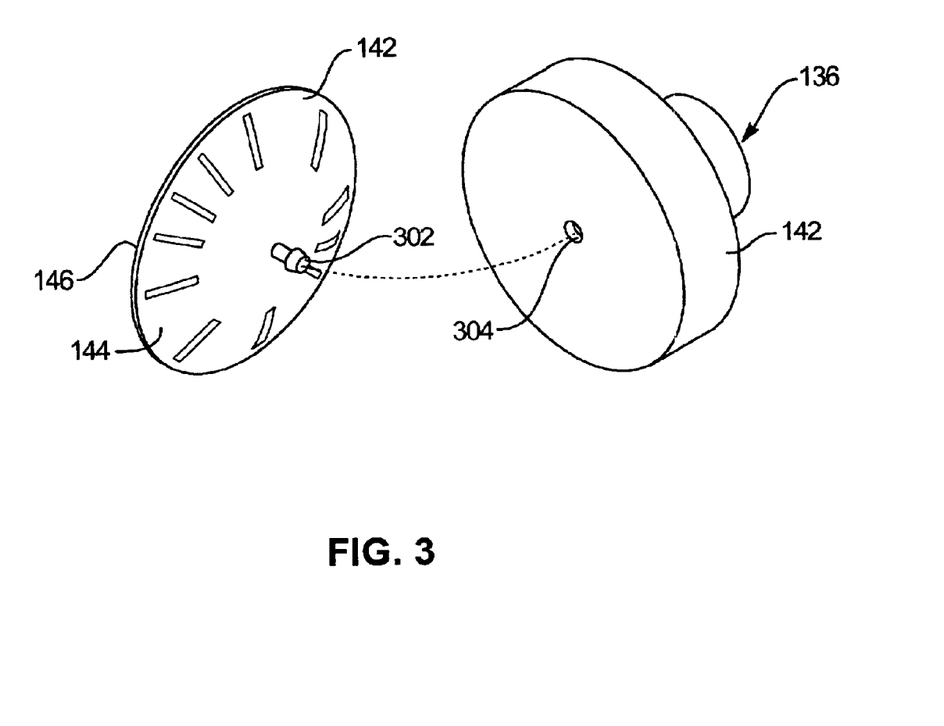
FIG. 3 is an exploded, perspective view of the attachment mechanism and housing of FIG. 1.

Referring now to FIG. 3, there is shown a perspective view of the suction cup 142 prior to insertion into the housing 140 of the wireless camera 136. An engagement member 302 on the suction cup 142 is inserted into and retained within an orifice 304 on the housing 140 to secure the suction cup 142 to the housing 140. Retention of the engagement member 302 within the orifice 304 may be removable or permanent.

Figure 4:
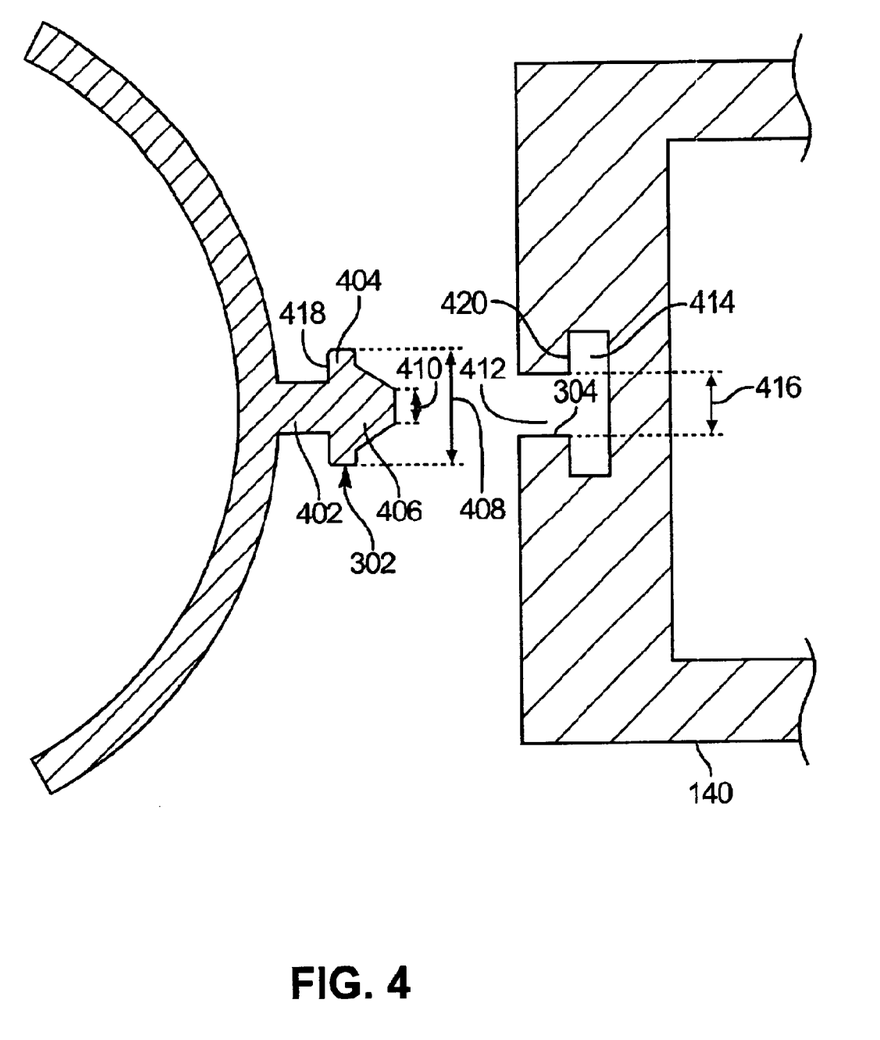
FIG. 4 is a side-elevation, cross-sectional view of a portion of the attachment mechanism and housing of FIG. 1.

Referring now to FIG. 4, there is shown a side elevation, cross-sectional view of the suction cup 142 and a portion of the housing 140, depicting the orifice 304 of the housing 140 and the engagement member 302 prior to insertion into the orifice 304. The engagement member 302 consists of an extension member 402, a head 404, and a tip 406. The head 404 has a head diameter 408. The tip 406 has a tapering configuration terminating in a tip diameter 410. The orifice 304 has a channel 412 and a retaining cavity 414. The channel 412 has a channel diameter 416 that is slightly larger than the tip diameter 410 and slightly smaller than the head diameter 408.

The head 404 is made of a soft, flexible material such as a polymer or elastomer; the head 404 may be integrally formed with the remainder of the suction cup 142. The head 404 may compress slightly to the channel diameter 416. Thus, to attach the suction cup 142 to the housing 140, one simply inserts the head 404 through the channel 412 and into the retaining cavity 414.

Once the head 404 reaches the retaining cavity 414, the head 404 expands to the head diameter 408. A securing ledge 418 engages a retaining ledge 420 to secure the head 404 within the retaining cavity 414. To remove the suction cup 142 from the housing 140, one may simply pull the suction cup 142 away from the housing 140. The head 404 compresses and is released from the retaining cavity 414. If desired, the head 404 and the channel 412 may be relatively sized such that the head 404 is permanently retained in the orifice 304.

Of course, FIGS. 3 and 4 illustrate only one of many ways that the suction cup 142 may be secured to the housing 140. In one alternate embodiment, a suction cup may include a hook that is inserted into an orifice on the bottom of a housing. In another alternate embodiment, a suction cup may be formed as an integral portion of a housing. Numerous other variations exist that will be readily apparent to those skilled in the art.

Figure 5:
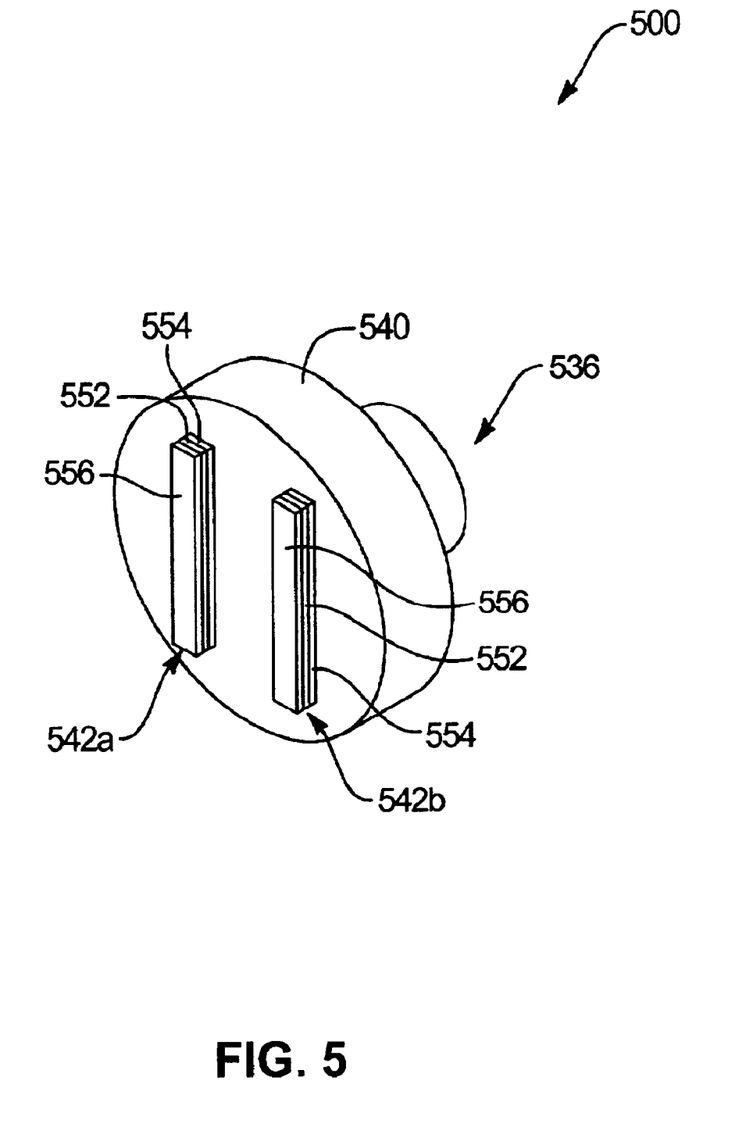
FIG. 5 is a rearward-oriented, perspective view of an alternative embodiment of an apparatus for obtaining a video signal from a position proximate an eye level of a person viewing a display screen.

Referring now to FIG. 5, there is shown a perspective view of an alternative embodiment of an apparatus for obtaining a video signal from a position proximate an eye level of a person viewing a display screen. The apparatus 500 has a wireless camera 536 having a lens (not shown) contained within a housing 540. An attachment mechanism 542 takes the form of two strips of double-sided tape 542a and 542b secured to the housing 540 opposite the lens.

Each strip of double-sided tape 542a and 542b includes a backing layer 552, a first adhesive layer 554, and a second adhesive layer 556. The backing layer is sandwiched between the first and second adhesive layers 554, 556. The first adhesive layer 554 secures the double-sided tape 542a and 542b to the housing 540. The second adhesive layer 556 removably secures the double-sided tape 542a and 542b to the screen portion 112 such that the wireless camera 536 is disposed between the display screen 108 and the person 118.

The adhesive layers 556 on the double-sided tape 542a and 542b may be of any type that can be firmly adhered to a porous surface, such as plastic or glass, and removed without damaging the surface. There are a number of commercially available products that meet these requirements. One such product is Wallsaver™ Removable Poster Tape, available from 3M® of St. Paul, Minn.

In the alternative, some type of adhesive layer besides the double-sided tape 542a and 542b may be used. For example, a thin, elastomeric strip (not shown) coated with an adhesive substance may be disposed on the housing 540 in place of the double-sided tape 542 and 542b. An adhesive putty, such as the type used to post pictures and other decorations on vertical surfaces, may alternatively be used. As yet another alternative, the attachment mechanism may take the form of an adhesive layer applied directly to the housing 540 with no backing layer.

Figure 6:
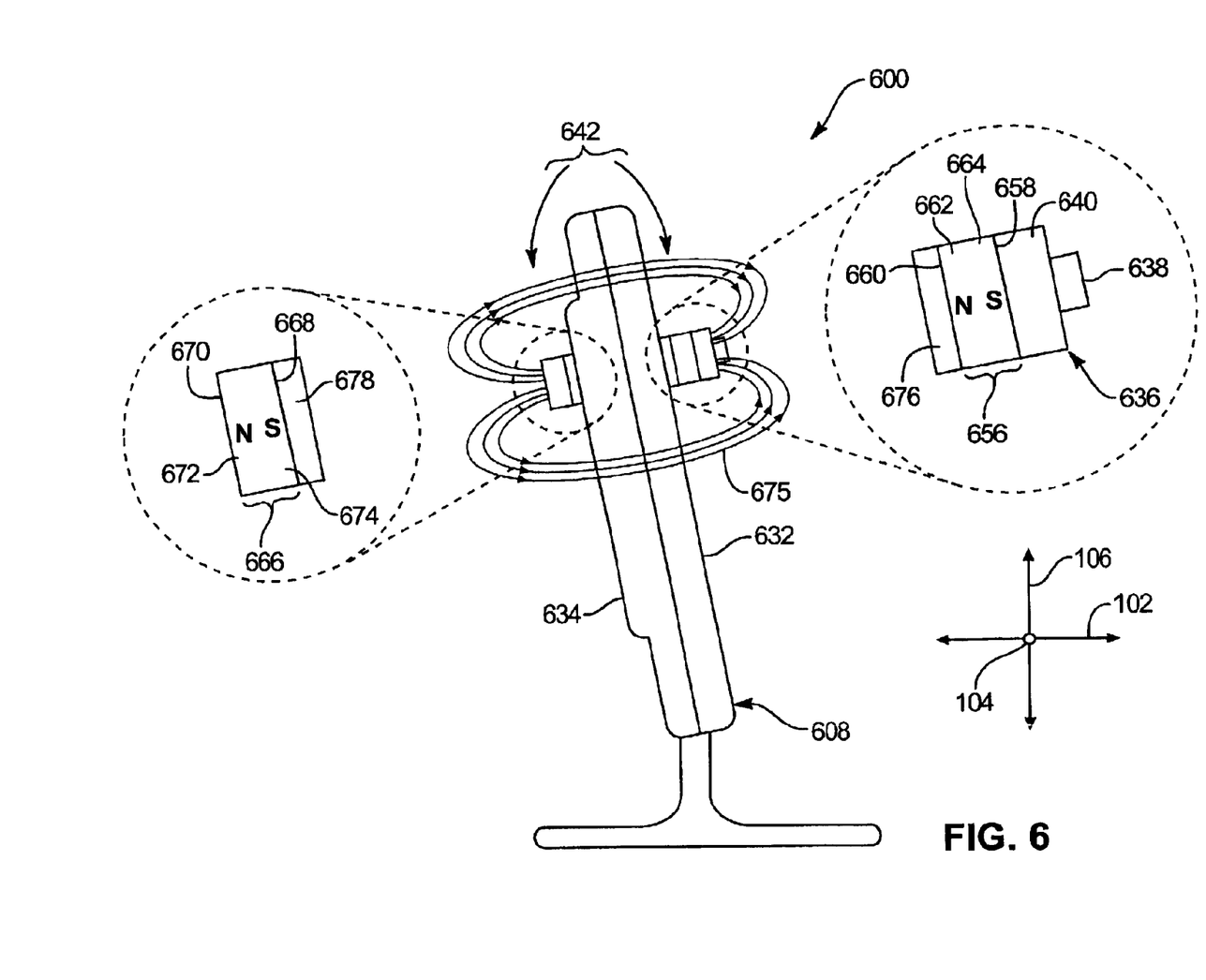
FIG. 6 is a side-elevation view of another alternative embodiment of an apparatus for obtaining a video signal from a position proximate an eye level of a person viewing a display screen.

Referring now to FIG. 6, there is shown a perspective view of another alternative embodiment of an apparatus for obtaining a video signal from a position proximate an eye level of a person viewing a display screen. The apparatus 600 may be used in conjunction with a display screen 608 that takes the form of a flat panel display 608. The flat panel display 608 includes a screen portion (not shown) on which images are displayed, a front side 632, and a back side 634.

As used herein, the phrase "flat panel display" refers to any display screen that utilizes a technology other than cathode-ray tubes, and may take the form of a liquid crystal display (LCD), liquid plasma display, electroluminescent display (EL), field emission display (FED), or the like. Displays for television viewing, desktop computing, mobile computing, and the like are all contemplated within the meaning of "flat panel display."

The apparatus 600 has a wireless camera 636 having a lens 638 contained within a housing 640. An attachment mechanism 642 may be used to removably attach the camera 636 to the screen portion of the display screen 608. As configured in FIG. 6, the attachment mechanism 642 includes a first magnet 656 having a first end 658, a second end 660, a north magnetic pole 662, and a south magnetic pole 664. The north magnetic pole 662 is disposed in the second end 660, and the south magnetic pole 664 is disposed in the first end 658. Hence, the first magnet 656 may have a magnetic orientation that points toward the display screen 608, from the second end 660 to the first end 658. The housing 640 is secured to the first side 658 of the first magnet 656.

The attachment mechanism 642 also includes a second magnet 666 having a first end 668, a second end 670, a north magnetic pole 672, and a south magnetic pole 674. The north magnetic pole 672 is disposed in the second end 670, and the south magnetic pole 674 is disposed in the first end 668. Consequently, the second magnet 666 may have a magnetic orientation that points from the second end 670 to the first end 668, in alignment with that of the first magnet 656.

If the first and second magnets 656 and 666 are substantially aligned along the longitudinal direction 102, the magnets 656, 666 will lie along a common magnetic flux path 675. Since each of the magnets 656, 666 decreases the reluctance of the magnetic flux path 675 for the other magnet 656 or 666, mechanical force will tend to hold the magnets 656, 666 in alignment and draw the north pole 662 of the first magnet 656 toward the south pole 674 of the second magnet 666.

Optionally, a first protective pad 676 may be secured to the second side 660 of the first magnet 656, and a second protective pad 678 may be secured to the first side 668 of the second magnet 666. The first and second protective pads 676 and 678 protect the flat panel display 608 from scratches, gouges, or the like. The protective pads 676, 678 may be made out of a comparatively soft material such as foam, plastic, or rubber.

The magnetic force tending to urge the first and second magnets together creates frictional force between the protective pads 676, 678 and the screen portion of the display screen 608 to keep the magnets 656, 666 from sliding along the display screen 608. Hence, the wireless camera 636 is removably secured between the flat panel display 608 and the person 118, the person 118 may simply grasp and pull either of the magnets 656, 666 in the longitudinal direction 102, away from the display screen 608, to release both magnets 656, 666.

The magnets 656, 666 may take a variety of forms. For example, each of the magnets 656, 666 may be a permanent magnet such as a Neodymium-based or Cobalt-based magnet. The magnets 656, 666 need not be polarized along the longitudinal direction 102, as shown. For example, the magnets 656, 666 may be be polarized along the lateral direction 104 or the transverse direction 106; the magnets 656, 666 may then be laid such that the north and south poles of the first magnet 656 are positioned directly opposite the south and north poles, respectively, of the second magnet 666. The magnets 656, 666 may also be shaped differently than shown in FIG. 6; for example, each of the magnets 656, 666 may have a horseshoe shape, a rectangular prismic shape, or the like.

Alternatively, each of the magnets 656, 666 may be an electromagnet activated by a power source such as a battery attached to the magnet 656, 666. Indeed, If desired, one of the magnets 656, 666 may even be replaced by an unmagnetized piece of material with a low magnetic reluctance. For example, if the second magnet 666 were replaced by a block (not shown) of laminated transformer iron, the flux path 675 would still have a lower reluctance when the first magnet 656 and the block are aligned. Hence, magnetic force may still operate in substantially the same manner to keep the first magnet 656 and the block in place on the display screen 608.

The flat panel display 608 may be of a type that does not rely greatly upon the presence of magnetic fields for its operation. Hence, LCD displays and the like may be preferable. Furthermore, the thickness of the flat panel display 608 is somewhat exaggerated in the view of FIG. 6 for clarity. A thinner display may be advantageous because the magnets 656, 666 would not be required to produce an exceptionally high flux density to provide attachment.

Based on the foregoing, the present invention offers a number of advantages that are not available in conventional approaches. A person may utilize an apparatus according to the invention without modifying existing hardware such as a television or computer monitor. Furthermore, an apparatus according to the invention allows a person to easily position a camera proximate his eye level. Thus, during videoconferencing, a person may receive the impression that the person with whom he is communicating is looking him directly in the eye. Furthermore, after videoconferencing, the person may easily remove the camera from proximate his eye level in order to avoid interfering with other uses of the display screen.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. An apparatus for obtaining a video signal from a position proximate an eye level of a person viewing a display, the apparatus comprising:

a camera having a housing and a lens; and an attachment mechanism comprising first and second magnets, wherein the first magnet is secured to the housing, and wherein magnetic force between the first and second magnets removably secures the housing to a screen portion of the display such that the camera is disposed between the display and the person, and wherein the magnetic force alone secures the second magnet to a back side of the display.

2. The apparatus of claim 1, wherein the camera is a wireless camera.

3. The apparatus of claim 2, wherein the wireless camera operates according to a protocol selected from the group consisting of: IEEE 802.11, IEEE 802.11a, IEEE 802.11b, Bluetooth, HiperLan, and HiperLan/2.

4. The apparatus of claim 1, wherein the display comprises a flat panel display.

5. The apparatus of claim 1, further comprising a camera holder having a pocket, wherein the camera holder is affixed to the display such that the camera is able to rest within the pocket.

6. The apparatus of claim 5, wherein the camera further comprises an adjustable tilt setting.

7. The apparatus of claim 6, wherein the lens is exposed while the camera rests inside the pocket.

8. The apparatus of claim 1, wherein the camera is disposed in the center of the screen portion.

9. A method for obtaining a video signal from a position proximate an eye level of a person viewing a display, the method comprising:
   providing a camera having a housing and a lens;
   providing an attachment mechanism comprising first and second magnets; securing the first magnet of the attachment mechanism to the housing;
   removably securing the first magnet of the attachment mechanism directly to a screen portion of the display such that the camera is disposed between the display and the person; and
   removably securing the second magnet of the attachment mechanism to a back side of the display such that the second magnet is secured only by a magnetic force.

10. The method of claim 9, wherein providing a camera comprises providing a wireless camera.

11. The method of claim 10, wherein providing a wireless camera comprises providing a wireless camera that operates according to a protocol selected from the group consisting of: IEEE 802.11, IEEE 802.11a IEEE 802.11b, Bluetooth, HiperLan, and HiperLan 2.

12. The method of claim 9, wherein the display comprises a flat panel display.

13. The method of claim 9, further comprising:
   providing a camera holder having a pocket; and
   affixing the camera holder to the display such that the camera is able to rest within the pocket.

14. The method of claim 13, wherein providing a camera comprises providing a camera with an adjustable tilt setting.

15. The method of claim 14, further comprising inserting the camera inside the camera holder such that the lens is visible while the camera rests inside the pocket.

16. The method of claim 9, wherein the camera is disposed in the center of the screen portion.

17. An apparatus for obtaining a video signal from a position proximate an eye level of a person viewing a display, the apparatus comprising:
   a camera housing;
   a camera lens contained within the housing, the lens being configured to cause the convergence of light rays passing through the lens;
   a first magnet that exerts a magnetic force to removably secure the housing to a screen portion of the display such that the lens is disposed between the display and the person; and
   a second magnet that is secured to a back side of the display by only the magnetic force.

18. A method for obtaining a video signal from a position proximate an eye level of a person viewing a display, the method comprising:
   providing a camera having a housing and a lens;
   providing a first magnet;
   providing a second magnet; and
   removably securing the housing directly to a screen portion of the display using a magnetic force exerted by the first and second magnets, wherein the camera is disposed between the display and the person, wherein the second magnet is secured to a back side of the display only by the magnetic force.

* * * * *

UNITED STATES PATENT AND TRADEMARK OFFICE
CERTIFICATE OF CORRECTION

PATENT NO. : 6,943,843 B2  Page 1 of 1
APPLICATION NO. : 09/966334
DATED : September 13, 2005
INVENTOR(S) : James H. Boyden et al.

It is certified that error appears in the above-identified patent and that said Letters Patent is hereby corrected as shown below:

Title Page # 54
Title line, insert hyphen to change "Eye-to Eye" to --Eye-to-Eye--

Column 1, lines 2, insert hyphen to change "Eye-to Eye" to --Eye-to-Eye--

Column 2, line 59, ". . .for purposes, other . . ." change to --for purposes other--

Column 3, line 66, ". . . audio communication, Thus, . . ." change to --audio communication. Thus,--

Column 5, line 67, ". . . 103 by a fastening . . ." change to --108 by a fastening--

Column 10, line 1, ". . . the person 118, the person 118 . ." change to --the person 118. The person 118--

Column 12, line 1, ". . . IEEE 802.11a IEEE 802.11b . . ." change to --IEEE 802.11a, IEEE 802.11b--

Column 12, line 2, ". . . and HiperLan 2." change to --and HiperLan/2.--

Signed and Sealed this

Ninth Day of January, 2007

JON W. DUDAS
*Director of the United States Patent and Trademark Office*